(12) United States Patent
Tian et al.

(10) Patent No.: US 8,948,735 B2
(45) Date of Patent: Feb. 3, 2015

(54) MOBILE TERMINATION ROAMING FORWARDING FOR MOBILE DEVICES

(75) Inventors: Lu Tian, Plano, TX (US); Richard Ejzak, Wheaton, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 441 days.

(21) Appl. No.: 13/350,918

(22) Filed: Jan. 16, 2012

(65) Prior Publication Data

US 2012/0190351 A1    Jul. 26, 2012

Related U.S. Application Data

(60) Provisional application No. 61/434,961, filed on Jan. 21, 2011.

(51) Int. Cl.
| | |
|---|---|
| *H04M 3/42* | (2006.01) |
| *H04W 8/12* | (2009.01) |
| *H04W 8/06* | (2009.01) |
| *H04W 76/02* | (2009.01) |

(52) U.S. Cl.
CPC . *H04W 8/12* (2013.01); *H04W 8/06* (2013.01); *H04W 76/027* (2013.01)
USPC .................. 455/417; 455/433; 455/432.1

(58) Field of Classification Search
USPC ........... 455/417, 445, 433, 435.1, 435.2, 437, 455/439, 436, 432.1; 370/401, 340, 466, 370/328, 331, 338, 467, 351
See application file for complete search history.

(56) References Cited

U.S. PATENT DOCUMENTS

2010/0226361 A1* 9/2010 Betti et al. ............... 370/352
2011/0319089 A1* 12/2011 Sharma et al. ............ 455/445

FOREIGN PATENT DOCUMENTS

WO    2008033951    3/2008

OTHER PUBLICATIONS

Zhang_WO2008_033951A2.pdf.*
Drevon_WO2009_153257A1.pdf.*
GPP TS 23.272 V10.2.1 (Jan. 2011): 3rd Generation Partnership Project; Technical Specification Group Services and System Aspects; Circuit Switched (CS) fallback in Evolved Packet System (EPS); Stage 2(Release 10); 3GPP Standard; 3GPP TS 23.272, 3rd Generation Partnership Project (3GPP), Mobile Competence Centre; 650, Route Deslucioles; F-06921 Sophia-Antipolis Cedex; France, No. V10.2.1, Jan. 4, 2011; pp. 1-79; XP050462516, [retrieved Jan. 4, 2011].

(Continued)

*Primary Examiner* — Charles Appiah
*Assistant Examiner* — Alexander Yi
(74) *Attorney, Agent, or Firm* — Carmen Patti Law Group, LLC

(57) ABSTRACT

A method for delivering a mobile terminated call to a mobile device communicating with a mobile switching center (MSC) in one example comprises steps of attempting to deliver the mobile terminated call to a mobile device, receiving a message that the mobile device is no longer in the location area served by the visiting MSC and forwarding the mobile terminated call to a different visiting MSC. The mobile terminated call is forwarded directly from one VMSC to another VMSC without requiring two potentially international calls to be placed serially from the GMSC to a VMSC. This method of Mobile Termination Roaming Forwarding can reduce substantial delay in call setup while saving network resources during establishment of the first call.

12 Claims, 4 Drawing Sheets

(56) References Cited

OTHER PUBLICATIONS

Ericsson et al; 3GPP TSG CT4 Meeting #51bis; C4-110038; Mobile Terminating Roaming Forwarding; 3GPP Draft; C4-110038, 3RD Generation Partnership Project (3GPP), Mobile Competence Centre; 650, Route Deslucioles; F-06921 Sophia-Antipolis Cedex; France, No. CT WG4, No. Ljubljana; 20110124; Jan. 14, 2011; pp. 1-2; XP050483849, [retrieved Jan. 14, 2011].

Ericsson et al; 3GPP TSG SA WG2 Meeting #83; CSFB for terminating calls; new mobile roaming forwarding service; 3GPP Draft; S2-11XXXX_23272_MTRF_R11; 3rd Generation Partnership Project (3GPP); Mobile Competence Centre; 650, Route Deslucioles; F-06921 Sophia-Antipolis Cedex; France, vol. CT WG4, No. Ljubljana; 20110124, Jan. 14, 2011; pp. 1-6; XP050484008, [retrieved Jan. 4, 2011].

Alcatel-Lucent; 3GPP TSG CT4 Meeting #51bis; C4-110267; Mobile Terminating Roaming Forwarding; 3GPP Draft; C4-110267, 3rd Generation Partnership Project (3GPP); Mobile Competence Centre; 650, Route Deslucioles; F-06921 Sophia-Antipolis Cedex; France, vol. CT WG4, No. Ljubljana; 20110124, Jan. 24, 2011; pp. 1-5; XP050484034 [retrieved on Jan. 24, 2011].

Alcatel-Lucent et al; 3GPP TSG SA WG2 Meeting #83; S2-111211; Introduction of MT Roaming Forwarding for CSFB; 3GPP Draft; S2-111211_WAS0968_WAS0895WAS0626_23272R10_MTRF, 3rd Generation Partnership Project (3GPP); Mobile Competence Centre; 650, Route Deslucioles; F-06921 Sophia-Antipolis Cedex; France, vol. SA WG2, No. Salt Lake City; 20110221, Feb. 26, 2011; pp. 1-7; XP050524200, [retrieved on FEb. 26, 2011].

Alcatel-Lucent et al; 3GPP TSG CT4 Meeting #52; C4-110758; Mobile Terminating Roaming Forwarding; 3GPP Draft; C4-110758; 3rd Generation Partnership Project (3GPP); Mobile Competence Centre; 650, Route Deslucioles; F-06921 Sophia-Antipolis Cedex; France, vol. CT WG4, No. Salt Lake City; 20110221, Feb. 28, 2011; pp. 1-5; XP050484499; [retrieved on Feb. 28, 2011].

3GPP TS 23.018 V10.0.0 (Dec. 2010): 3rd Generation Partnership Project; Technical Specification Group Core Network and Terminals; Basic call handling; Technical realization (Release 10); 3GPP Standard; 3GPP TS 23.018, 3rd Generation Partnership Project (3GPP), Mobile Competence Centre; 650, Route Des Lucioles; F-06921 Sophia-Antipolis Cedx; France; No. v10.0.0, Dec. 17, 2010; pp. 1-285; XP050462234; retrieved on Dec. 17, 2010.

* cited by examiner

MOBILE TERMINATION ROAMING FORWARDING FOR MOBILE DEVICES

CROSS-REFERENCE TO RELATED APPLICATIONS

This application claims the benefit of the filing date, and incorporates by reference in its entirety Provisional Patent Application 61/434,961 filed Jan. 21, 2011.

FIELD OF THE INVENTION

The invention relates generally to wireless communication systems and more particularly to the handling of mobile terminated calls during location updates.

BACKGROUND

Today's wireless telecommunications networks provide telephone subscribers with the ability to access telecommunications services from almost anywhere in the world. The key to facilitating such world-wide access is mobility management. With mobility management, wireless networks are able to track the location of mobile stations so that mobile services can be delivered to them.

A wireless network is typically formed of a number of cells, each covering a small geographic area within which a mobile device, such as a mobile station, may receive mobile services. Each cell is equipped with a base station that provides radio coverage to the cell, thereby enabling communication with mobile devices located within the cell. By integrating the coverage of multiple base stations, a wireless network is able to provide radio coverage to mobile stations over a large geographic area.

The coverage area of a collection of neighboring base stations is commonly referred to as a location area. Each location area is served by a mobile switching center (MSC), and each MSC may serve multiple location areas. The MSC is the network node that provides circuit-switched calling, mobility management and other telecommunications/mobile services to mobile subscribers. In particular, the MSC maintains subscriber data for all mobile subscribers that are currently located within one of the location areas served by the MSC. Mobile subscriber data is permanently maintained in a home location register (HLR) within the wireless network. When the mobile station is within the range of an MSC, that MSC acquires a copy of the mobile subscriber data from the HLR and maintains it in a visiting location register (VLR). The location area of the mobile station is also maintained in the visiting location register (VLR) for the MSC to page the mobile station in the location area for a mobile termination call. An MSC that is associated with the current location area of a mobile station is referred to as a visiting mobile switching center (VMSC) relative to the mobile station. The MSC receiving a call that is intended for the mobile subscriber is referred to as a Gateway MSC.

When a mobile station moves or "roams" into a new location area, the mobile station must inform the wireless network of the change in location area by performing what is commonly referred to as a location update procedure. Each mobile device is responsible for comparing the stored LAI (location area id) with the LAI of the newly selected cell. If the mobile device finds that the received LAI is different from the stored LAI, the mobile device sends a location update request to the wireless network. If the new location is served by a different VMSC than the previous location area, an inter-VLR location update is performed.

During the inter-VLR location update, the new VMSC that receives the location update request from the mobile station transmits an update location message to the HLR of the mobile subscriber. Upon receiving the update location message, the HLR forwards the subscriber data associated with the mobile subscriber to the new VMSC for temporary storage in the VLR of the new VMSC and updates its records to indicate that the mobile station is now served by the new VMSC. In addition, the HLR sends a message to the old VMSC to delete its subscriber record for this mobile subscriber since the mobile station is no longer served by the old VMSC.

Once the location update procedure is complete, the mobile station stores the new LAI and can continue to receive mobile services through the new VMSC. For example, in a typical mobile terminated call scenario, an incoming call to the mobile station is first routed to a gateway mobile switching center (GMSC) of the called mobile station's HPLMN (Home Public Line Mobile Network). Upon receiving the call, the GMSC queries the HLR of the mobile subscriber to determine the VMSC on which the mobile station is currently registered. The HLR typically obtains routing information from the VMSC and returns it to the GMSC. The GMSC uses the routing information to route the call to the VMSC. The VMSC accesses its subscriber data for the called mobile subscriber to determine its location area and pages the mobile station within that location area to set-up a call connection between the caller and the mobile subscriber.

However, if the mobile terminated call is received during the time that the mobile station is performing an inter-VLR location update, the mobile terminated call may not be completed to the mobile station. For example, if the HLR has not yet been informed of the change in VMSC when the GMSC queries the HLR for routing information, the HLR will return the routing information for the old VMSC to the GMSC. Thus, the GMSC will route the call to the old VMSC which will attempt to page the mobile station. Since the mobile station is no longer in the VMSC location area, the mobile device will not be able to answer the page. Currently, when a mobile device does not answer a page for a mobile terminated call, the VMSC requests the GMSC to reroute the call to the new VMSC. This mechanism is called Mobile Termination Roaming Retry (MTRR) and is further described in WO 2008/033951, Delivery of Mobile Terminated Call During Inter-VLR Location Update, incorporated by reference. This is dissatisfactory for many mobile subscribers and network providers since two potentially international calls must be placed serially from the GMSC to a VMSC. This can introduce substantial delay in call setup while wasting network resources during establishment of the first call.

Therefore, what is needed is an improved mechanism for delivering mobile terminated calls to mobile stations during inter-VLR location updates.

SUMMARY

Embodiments of the present invention disclose a method and apparatus for routing a mobile terminated call locally from an old VMSC/VLR to a new VMSC/VLR during an inter MSC Location Update operation.

In one embodiment, there is provided a method for delivering a mobile terminated call to a mobile device communicating with a mobile switching center (MSC) comprising the steps of attempting to deliver the mobile terminated call to a mobile device, receiving a message that the mobile device is no longer in the location area served by the MSC and forwarding the mobile terminated call to a different MSC.

Some embodiments of the above method further comprise the step of receiving an initial address message with a mobile station roaming number from an home location register (HLR) assigned to the mobile device.

Some embodiments of any of the above methods further include wherein the different MSC sends an update location request to the HLR with an MTRF flag set when the different MSC receives a Location Update message from the mobile device.

Some embodiments of any of the above methods further comprise the steps of receiving a cancel location message with an address of the different MSC, stopping the attempt to deliver the mobile terminated call to the mobile device and sending a mobile terminated roaming forwarding request (MTRF) to the different MSC.

Some embodiments of any of the above methods further comprise the steps of receiving a mobile station roaming number from the different MSC and delivering an initial address message referring to the mobile terminated call to the different MSC.

Some embodiments of any of the above methods further include wherein mobile device is an LTE (Long Term Evolution) device, the mobile terminated call originates from a circuit-switched network and the attempting step further comprises the step of sending a circuit-switched page to an LTE radio in the mobile device.

Some embodiments of any of the above methods further comprise the step receiving an update location request from the LTE mobile device that has retuned to a 2G/3G radio from the LTE radio.

Some embodiments of any of the above methods further include wherein the different MSC is an MSC designated to handle circuit-switched calls for LTE mobile devices.

In another embodiment, there is provided a method for delivering a mobile terminated call to a mobile device comprising the steps of receiving an initial address message (IAM) for the mobile device from a gateway mobile switching center (GMSC), paging the mobile device that is referenced by the IAM, receiving a cancel location message from the home location register (HLR) assigned to the mobile device, the cancel location message including a mobile terminated roaming forwarding (MTRF) flag and addresses of a new visiting mobile switching center/visiting location register (VMSC/VLS), sending, a provide routing number message to the new VMSC/VLR, receiving a PRN Response message from the new VMSC/VLR and forwarding the IAM to the new VMSC/VLR.

Some embodiments of any of the above methods further comprise the step of sending a provide routing number acknowledge message (PRN ACK) to the HLR in response to a PRN message from the HLR in response to the SRI message from the GMSC and wherein the IAM message is received after the PRN ACK message is sent.

Some embodiments of any of the above methods further include wherein the mobile device initiates a location update procedure after the IAM message is received.

Some embodiments of any of the above methods further comprise the step of, if the MTRF flag is not set in the cancel location message, requesting the GMSC to reroute the call to the new VMSC/VLR.

Some embodiments of any of the above methods further comprise the step of, if the MTRF flag is set in the cancel location message, checking roaming agreements with the new VMSC/VLR in response to the cancel location message and if MTRF is not allowed, requesting the GMSC to reroute the call to the new VMSC/VLR.

Some embodiments of any of the above methods further include wherein the HLR, old VMSC/VLR and new VMSC/VLR are located in the same Public Land Mobile Network (PLMN).

Some embodiments of any of the above methods further include wherein the HLR, old VMSC/VLR and new VMSC/VLR are not located in the same Public Land Mobile Network (PLMN) and each checks roaming agreements before performing allowing a MTRF operation.

Some embodiments of any of the above methods further include wherein the mobile device is an LTE (Long Term Evolution) device, the GMSC is a 2G/3G device, the new VMSC/VLR is an MSC/VLR designated to handle circuit-switched calls for LTE mobile devices and the paging step further comprises the step of sending a circuit-switched page to an LTE radio in the mobile device.

In another embodiment, there is provided an apparatus for use in a telecommunications network for delivering a mobile terminated call to a mobile device, said apparatus configured so as to perform the steps of receiving an initial address message (IAM) for the mobile device from a gateway mobile switching center (GMSC), paging the mobile device that is referenced by the IAM, receiving a cancel location message from the home location register (HLR) assigned to the mobile device, the cancel location message including a mobile termination roaming forwarding (MTRF) flag and addresses of a new visiting mobile switching center/visiting location register (VMSC/VLR), sending a provide roaming number (PRN) message to the new VMSC/VLR, receiving a PRN Response message from the new VMSC/VLR and forwarding the IAM to the new VMSC/VLR.

Some embodiments of the above apparatus may be further configured to perform the step of sending a provide routing number acknowledge message (PRN ACK) to the HLR in response to a PRN message from the HLR in response to the SRI message from the GMSC, wherein the IAM message is received after the PRN ACK message is sent.

Some embodiments of the above apparatus may be further configured to perform the steps of, if the MTRF flag is not set in the cancel location message, requesting the GMSC to reroute the call to the new VMSC/VLR and if the MTRF flag is set in the cancel location message, checking roaming agreements with the new VMSC/VLR in response to the cancel location message and if MTRF is not allowed, requesting the GMSC to reroute the call to the new VMSC/VLR.

Some embodiments of the above apparatus may further include wherein the HLR, old VMSC/VLR and new VMSC/VLR are not located in the same Public Land Mobile Network (PLMN) and each checks roaming agreements before performing allowing a MTRF operation.

Some embodiments of the above apparatus may further include wherein the mobile device is an LTE (Long Term Evolution) device, the GMSC is a 2G/3G device, the new VMSC/VLR is an MSC/VLR designated to handle circuit-switched calls for LTE mobile devices and the paging step further comprises the step of sending a circuit-switched page to an LTE radio in the mobile device.

DESCRIPTION OF THE DRAWINGS

Features of example implementations of the invention will become apparent from the description, the claims, and the accompanying drawings in which:

DETAILED DESCRIPTION

Wireless networks around the world are in the process of updating from second and third generation (2G/3G) networks to Long Term Evolution (LTE, also known as 4G) networks. Until LTE networks and mobile stations fully support voice services directly over LTE, the mobile stations must be capable of performing the Circuit-Switched FallBack (CSFB) procedure to be able to support voice services on 2G/3G. CSFB requires that the LTE mobile station perform the location update procedure with the circuit-switched core network so that LTE mobile station is reachable for mobile-terminated circuit-switched calls. The LTE access network is configured to pass location update messages from LTE mobile stations to a 2G/3G VMSC. When a mobile terminated call is received by the GMSC for a mobile station currently camped on LTE, the mobile station normally receives a circuit-switched page request on the LTE radio via the VMSC and LTE access network, recognizes that it cannot complete the call on LTE and initiates the CSFB procedure by retuning to a 2G/3G radio to respond to the page and allow the call to complete. There are several cases, however, when the 2G/3G radio to which the mobile station retunes is not in a location area of the VMSC. This can occur, for example, when the mapping of LTE tracking areas to CS location areas is imprecise, when the mobile station is on a border between location areas, or when the VMSC managing the 2G/3G radio to which the mobile station retunes has not been upgraded or configured to accept location update requests via the LTE access network. In this latter case, the LTE access network may be configured to send location update requests to a compatible VMSC that is not associated with the location area of the 2G/3G radio. In all of these cases, the mobile station first performs the location update procedure upon retuning to the 2G/3G radio, after which MTRR and potential alternative algorithms apply to enable successful call delivery. Rather than being an exception procedure during race conditions, as it is 2G/3G networks, this procedure will be common in some LTE networks.

Figure 1:
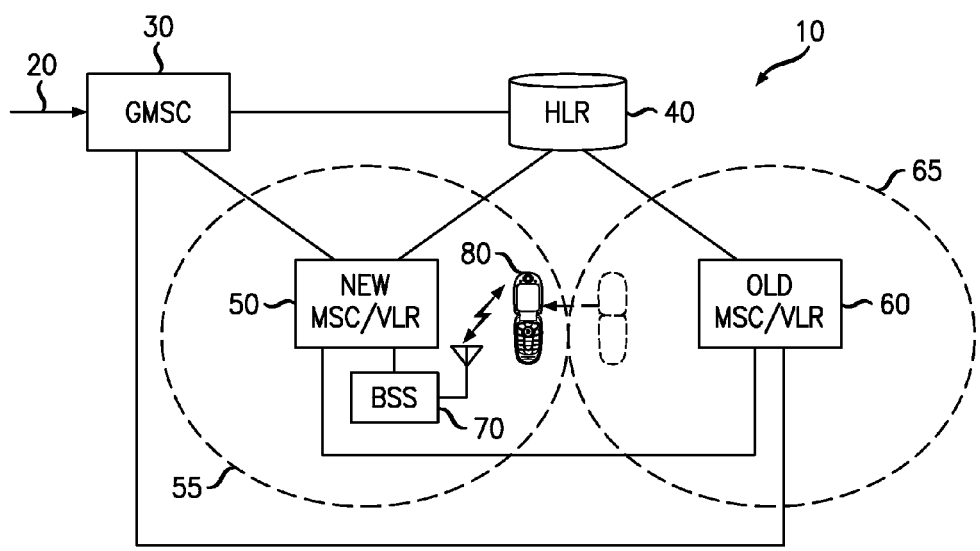
FIG. 1 is a block diagram illustrating an exemplary wireless network for delivering a mobile terminated call to a mobile station during an inter-VLR location update, in accordance with the embodiments of the present invention.

FIG. 1 is a block diagram illustrating an exemplary wireless network 10 for delivering a mobile terminated call 20 to a mobile station 80 during an inter-VLR location update, in accordance with embodiments of the present invention. The wireless network 10 includes a Gateway Mobile Switching Center (GMSC) 30, Mobile Switching Center/Visitor Location Registers (MSC/VLR 50 and 60), Base Station System (BSS) 70 for 2G (or Radio Network Controller (RNC) for 3G) and Home Location Register (HLR) 40. MSC/VLR 50 serves location area 55, while MSC/VLR 60 serves location area 65. It should be understood that each MSC/VLR 50 and 60 may serve multiple location areas. However, for simplicity, only one location for each MSC/VLR is shown.

As illustrated in FIG. 1, mobile station 80 has recently moved from location area 65 served by MSC/VLR 60 into location area 55 served by MSC/VLR 50. Thus, MSC/VLR 60 is labeled "old MSC/VLR", while MSC/VLR 50 is labeled "new MSC/VLR." Once the mobile station 80 realizes that is has roamed into the new location area 55 served by the new MSC/VLR 50 (i.e., by determining that the location area id (LAI) received from BSS 70 is new), the mobile station 80 sends a location update request to the new MSC/VLR 50 via BSS 70. Mobile station 80 may also send the location update request to new MSC/VLR 50 after receiving a page on an LTE network as described in paragraph [38].

Upon receiving the location update request, the new MSC/VLR 50 transmits an update location to the HLR 40 to retrieve the subscriber data associated with the mobile station 80 and to update the HLR 40 with the addresses of the new MSC/VLR 50. In addition, the HLR 40 transmits a cancel location message to the old MSC/VLR 60 instructing the old MSC/VLR 60 to delete the subscriber data record of the mobile station 80 since the mobile station 80 is not longer located in the location area 65 served by the old MSC/VLR 60.

If an incoming mobile terminated call 20 for the mobile station 80 is received at the GMSC 30 during the location update process as in conventional wireless networks, or when MS 80 is camped on an LTE network using a location area other than the underlying 2G/3G VMSCs, the GMSC 30 queries the HLR 40 for routing information to deliver the incoming call to the mobile station 80. If the HLR 40 has not yet received the update location message from the new MSC/VLR 50 when the GMSC query is received, either due to a timing overlap or the situation when MS 80 is an LTE equipment, the HLR 40 returns the routing information for the old MSC/VLR 60 to the GMSC 30. Thus, the GMSC routes the mobile terminated call 20 to the old MSC/VLR 60 for call handling.

When the old MSC/VLR 60 receives the call 20, it accesses its subscriber data for the mobile subscriber to determine the location area 65 of the mobile station 80, and pages the mobile station 80 within that location area 65 to attempt to set-up a call connection to the mobile station 80 for the mobile terminated call. However, since the mobile station 80 has moved out of location area 65 and into location area 55 and is currently performing a location update to the new MSC/VLR 50, or is camped on LTE using a location area other than that of the underlying 2G/3G MSCVLR, the mobile station 80 will not be able to answer the page from the old MSC/VLR 60.

Therefore, in accordance with the embodiments of the present invention, once the old MSC/VLR 60 receives the cancel location message from the HLR 40 that requests the old MSC/VLR 60 to delete the subscriber record for mobile station 80, the MSC/VLR 60 stops paging the mobile station 80. If the HLR 40, old MSC/VLR 60 and new MSC/VLR 50 all support a mobile termination roaming forwarding (MTRF) process, the old MSC/VLR 60 is able to request the routing information from the new MSC/VLR 50 so that the old MSC/VLR can send the call 20 directly to the new MSC/VLR 50. If one or more of the HLR 40, old MSC/VLR 60 and new MSC/VLR 50 do not support MTRF, the old MSC/VLR 60 reverts back to a mobile termination roaming retry (MTRR) process, as described in WO 2008/033951, Delivery of Mobile Terminated Call During Inter-VLR Location Update, incorporated by reference. In this case (MTRR), the old MSC/VLR 60 releases the call back to the GMSC 30 which requests new routing information from the HLR 40 and tries again to route the call.

In one embodiment of the present invention, the new MSC/VLR 50 sends an "MTRF supported" flag in the MAP Update Location to the HLR 40, the HLR 40 sends the new MSC/VLR addresses in Cancel Location to the old MSC/VLR 60 and then the old MSC/VLR 60 sends the MTRF request message (or an "MTRF request" indicator in MAP PRN)

message to the new MSC/VLR 50. The new MSC/VLR 50 returns the roaming information to the old MSC/VLR 60. The mobile terminated call will be routed locally from the old MSC/VLR 60 to the new MSC/VLR 50. This mechanism is called Mobile Termination Roaming Forwarding (MTRF).

Figure 2:
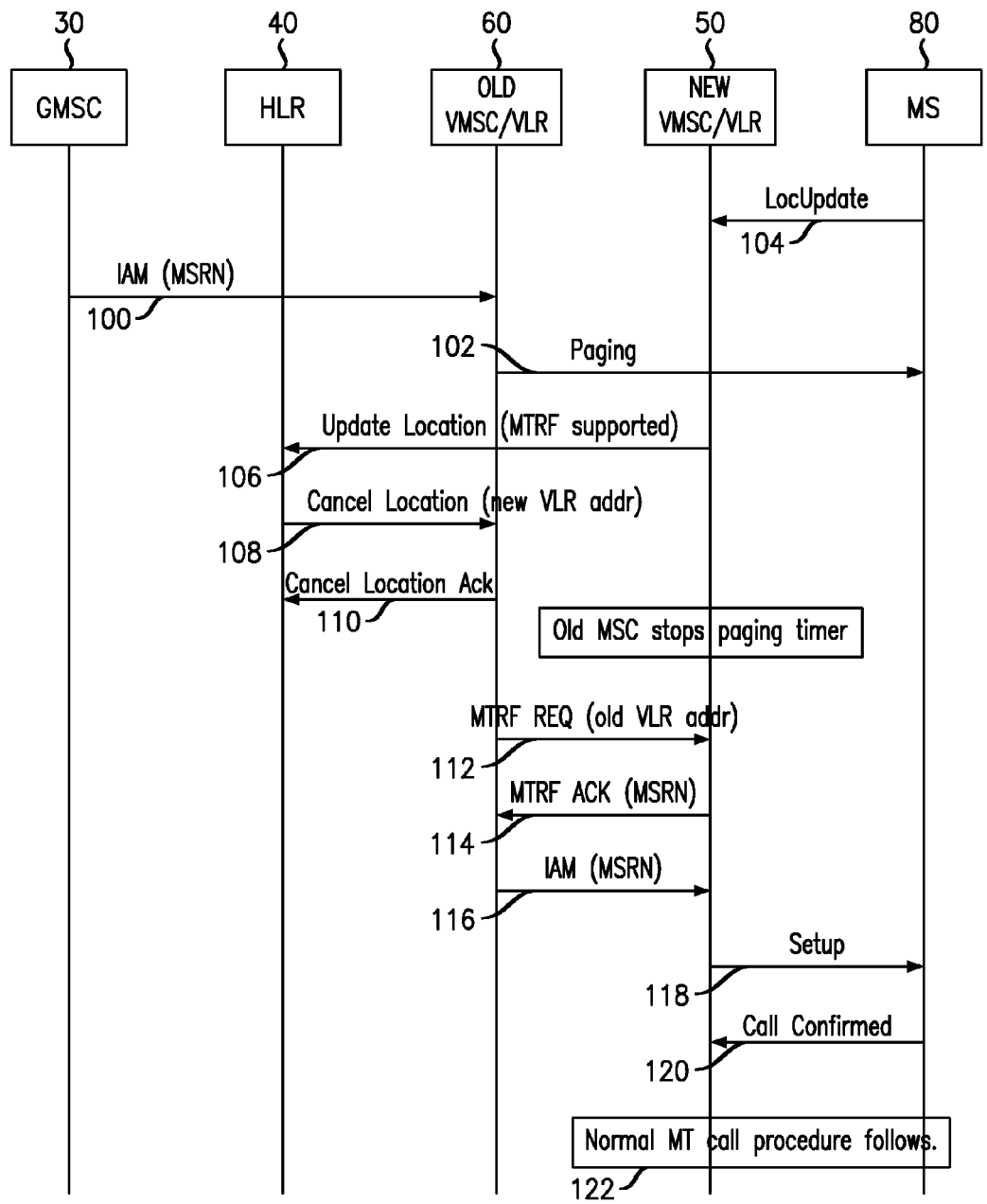
FIG. 2 is a signaling diagram illustrating exemplary signaling for delivering a mobile terminated call to a mobile station according to the embodiment shown in FIG. 1.
Figure 3:
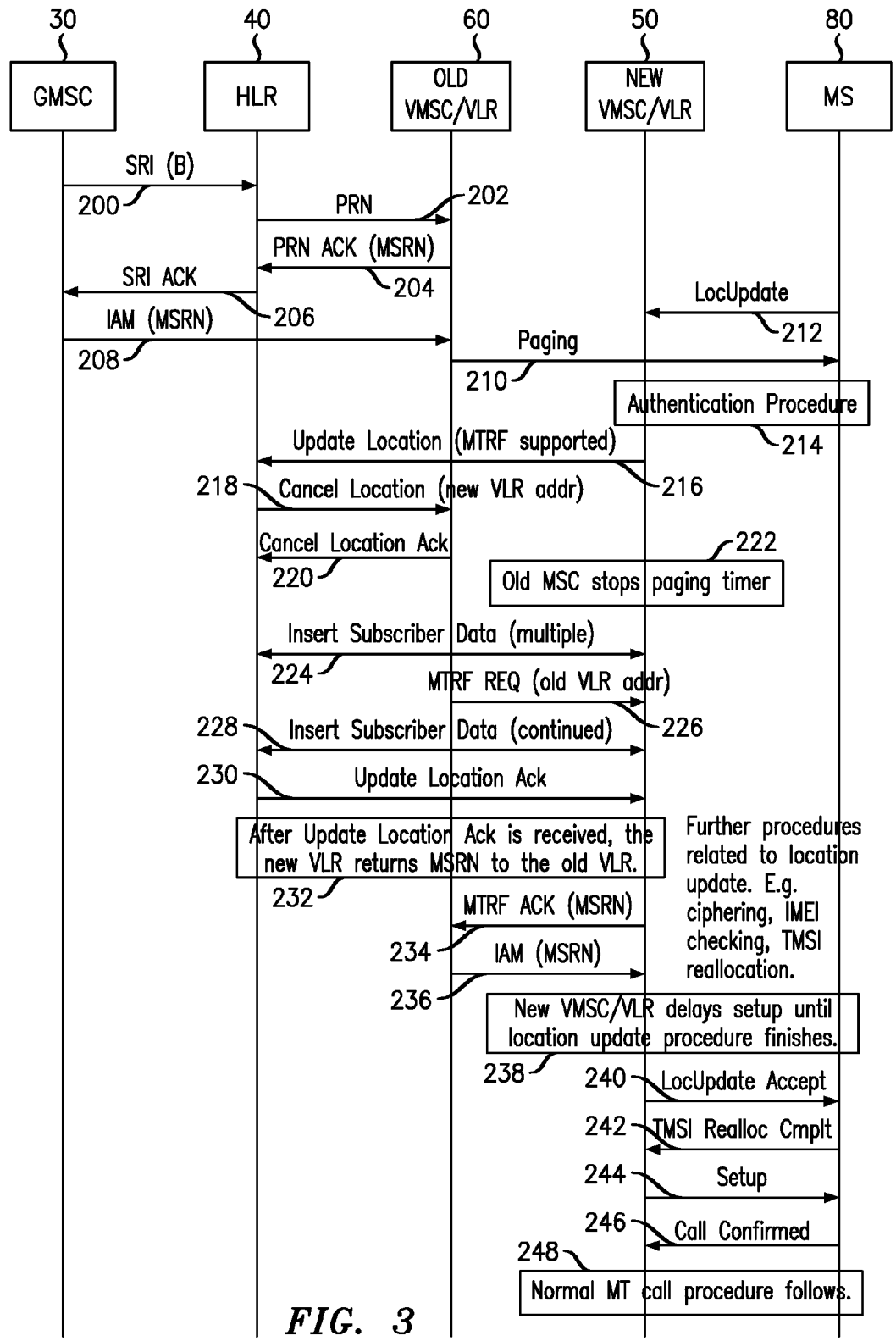
FIG. 3 is a signaling diagram illustrating a more detailed view of exemplary signaling for delivering a mobile terminated call to a mobile station according to the embodiment shown in FIG. 1.

FIG. 2 is a signaling diagram illustrating exemplary signaling for this embodiment. For explanatory purposes, FIG. 2 shows the signals directly related to the present embodiment. FIG. 3 show a more complete diagram of signals exchanged as part of the present embodiment.

After receiving a mobile terminated call request for MS 80 and determining a temporary routing number at which MS 80 can be reached via standard procedures, in FIG. 2, GMSC 30 sends an Initial Address Message (IAM) containing a Mobile Station Roaming Number (MSRN) to old MSC/VLR 60. The MSRN is an E.164 number that is temporarily assigned to the mobile station 80 for the mobile terminated call and can be used to route the mobile terminated call to the old MSC/VLR 60. In response, old MSC/VLR 60 attempts to page mobile station 80. Prior to this paging, however, mobile station 80 has left the location area of old MSC/VLR 60 and sent a Location Update message to the new MSC/VLR 50 serving its new location area at 104. Alternatively, MS 80 has received a page on an LTE network triggering the Location Update message to a new MSC/VLR 50 on a 2G/3G network. In response to the Location Update message, the new MSC/VLR 50 sends an Update Location message containing a "MTRF supported" flag to HLR 40 at 106. This lets HLR 40 know that the new MSC/VLR 50 supports MTRF.

In response to this message, HLR 40 checks its roaming agreements with the old and new MSCNLRs to determine whether or not to include the new MSC/VLR 50 addresses in a Cancel Location message at 108. Assuming that all three elements (HLR 40, old MSC/VLR 60 and new MSC/VLR 50) support MTRF, HLR 40 sends the Cancel Location message with the mew MSC/VLR 50 addresses to old MSC/VLR 60 at 108.

In response, the old MSC/VLR 60 stops paging the MS 80, sends a Cancel Location Acknowledge message 110 back to HLR 40 and checks its roaming agreements with the HLR 40 and the new MSC/VLR 50. If MTRF is supported, old MSC/VLR 60 sends an MTRF Request 112 with the old MSC/VLR 60 addresses to the new MSC/VLR 50. This request may also be referred to as a Provide Roaming Number (PRN) message with a "MTRF" indicator. If MTRF is not supported by one or more of the HLR 40, old MSC/VLR 60 and new MSC/VLR 50, the old MSC/VLR 60 reverts back to a mobile termination roaming retry (MTRR) process.

The new MSC/VLR 50 then processes the MTRF Request from old MSC/VLR 60 as if it were a PRN message from the HLR 40, with some small modifications described herein. In one embodiment, the MTRF Request message may comprise a standard PRN message with the addition of an "MTRF request" indicator. New MSC/VLR 50 may check roaming agreements with the HLR 40 and the old MSC/VLR 60 for MTRF. If MTRF is allowed, the new MSC/VLR 50 returns the MTRF acknowledge message with a new MSRN' to the old MSC/VLR 60 at 114. In response, old MSC/VLR 60 forwards the IAM of step 100 with the new MSRN' to the new MSC/VLR 50 and call set up proceeds normally as shown in steps 118, 120 and 122. If the new MSC/VLR 50 rejects the MTRF request from the old MSC/VLR 60, the new MSC/VLR 50 returns a negative response to the old MSC/VLR 60 so that the old MSC/VLR 60 can trigger MTRR.

If the HLR 40, new MSC/VLR 50 and old MSC/VLR 60 are within the same Public Land Mobile Network (PLMN), MTRF can always be triggered.

Between PLMNs, where the HLR 40, new MSC/VLR 50 and old MSC/VLR 60 may belong to three different PLMNs, the roaming agreements between them include billing clauses on how to charge the roaming calls with MTRF. Without roaming agreements for MTFR, MTRR applies. For example, if the HLR 40 and the new MSC/VLR 50 belong to the same PLMN and the old MSC/VLR 60 is an international MSC/VLR, the HLR 40 shall not permit MTRF.

In the present embodiment, MTRF does not require a Send ID message. It works for the Location Updates with International Mobile Subscriber Identity (IMSI). As noted above, MTRF is backward compatible with existing MTRR. If the new MSC/VLR 50 doesn't support MTRF, then the old MSC/VLR 60 triggers MTRR when a Cancel Location message is received.

For prepaging, the HLR 40 triggers MTRR.

FIG. 3 is a signaling diagram illustrating a more detailed view of exemplary signaling for delivering a mobile terminated call to a mobile station 80 according to the embodiment shown in FIG. 1.

In FIG. 3, when GMSC 30 receives a mobile terminated call request for mobile station 80, the GMSC transmits a Send Routing Information (SRI) message to the HLR 40 to retrieve routing information for the routing of the call to the old MSC/VLR, shown at 200. At 202, the HLR 40 accesses a subscriber record for the mobile station 80 to identify the old MSC/VLR 60 and transmit a Provide Roaming Number (PRN) message to the old MSC/VLR 60.

In response, the old MSC/VLR 60 transmits a PRN acknowledgement message 204 back to the HLR 40 that includes a Mobile Station Roaming Number (MSRN) for the mobile terminated call. The HLR 40 forwards the MSRN to the GMSC 30 in an SRI acknowledgment message at 206. Using the received MSRN, the GMSC 30 generates and transmits an Initial Address Message (IAM) containing the MSRN at 208 for the call to the old MSC/VLR 60. Upon receipt of the IAM, the old MSC/VLR 60 accesses the temporary subscriber record for the mobile station 80 to determine the location area within which the mobile station last reported it was located, and at 210, pages the mobile station within that location area.

Prior to paging by the old MSC/VLR 60, or in response to receiving a page from the old VMSC on an LTE network that causes MS 80 to return to a 2G/3G VMSC in a different location area, the mobile station 80 transmits a Location Update Request at 212 to the new MSC/VLR 50. After authentication of the mobile station 80 at 214, the new MSC/VLR 50 transmits an Update Location message at 216 to the HLR 40 to update the HLR 40 with the addresses of the new MSC/VLR 50. The new MSC/VLR 50 also sets a Mobile Termination Roaming Forwarding (MTRF) flag in the Update Location message. This lets HLR 40 know that the old MSC/VLR 60 supports MTRF.

In response to the Update Location message, HLR 40 checks its roaming agreements with the old and new MSC/VLRs to determine whether or not to include the new MSC/VLR 50 addresses in the Cancel Location message at 218. Assuming that all three elements (HLR 40, old MSC/VLR 60, new MSC/VLR 50) support MTRF, HLR 40 sends the Cancel Location message with the new MSC/VLR 50 addresses to old MSC/VLR 60 at 218, requesting the old MSC/VLR to delete the temporary subscriber record for the mobile station 80. Once the old MSC/VLR deletes the subscriber record for the mobile station 80, the old MSC/VLR stops paging the MS 80 at step 222 and transmits a cancel location acknowledgement message 220 back to the HLR 40.

Additional steps of the Update Location process are performed at 224, 228 and 230.

After receiving the Cancel Location message 218, the old MSC/VLR 60 also checks its roaming agreements with the HLR 40 and the new MSC/VLR 50. If MTRF is allowed, old MSC/VLR 60 sends an MTRF Request 226 with the old MSC/VLR 60 address to the new MSC/VLR 50. This request may also be referred to as a Provide Roaming Number (PRN) message with a "MTRF" indicator.

The new MSC/VLR 50 then processes the MTRF Request as if it were a PRN message from the HLR 40 and returns the MTRF acknowledge message with a new MSRN' to the old MSC/VLR 60 at 232, 234. In response, old MSC/VLR 60 forwards the IAM of step 208 with the new MSRN' to the new MSC/VLR 50 at step 236. The new MSC/VLR 50 delays setup until the location update procedure finishes at 238 and sends Location Update Accept message 240 to mobile station 80 at 240. Then call set up proceeds normally as shown in steps 242-248.

Figure 4:
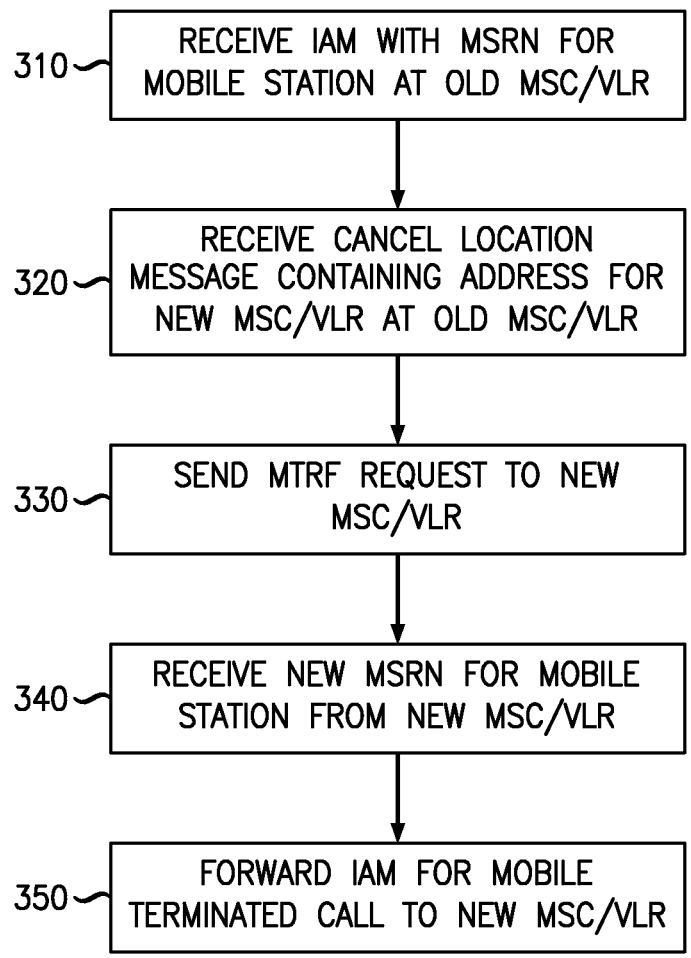
FIG. 4 is a flowchart illustrating an exemplary process for delivering a mobile terminated call to a mobile station.

FIG. 4 is a flowchart illustrating an exemplary process for delivering a mobile terminated call to a mobile station 80 according to the embodiment shown in FIGS. 1 and 2. When, at block 310, an IAM for a mobile terminated call to a mobile station 80 is received at an old MSC/VLR, and at block 320, a Cancel Location message for the mobile station 80 which contains the addresses of a new MSC/VLR 50 is also received at the old MSC/VLR 60, then at block 330, the old MSC/VLR 60 sends an MTRF request directly to the new MSC/VLR 50 requesting a replacement MSRN. Upon receiving the MSRN at block 340, the old MSC/VLR 60 forwards the IAM with the replacement MSRN to the new MSC/VLR 50.

In this manner, unnecessary routing of the call is avoided if the GMSC 30 is far away from the old MSC/VLR 60 and the new MSC/VLR 50. Also, the call setup time is reduced if the GMSC 30 is a long distance from the old MSC/VLR 60 and the new MSC/VLR 50.

The apparatus in FIG. 1 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for delivering a mobile terminated call to a mobile device, said method, performed by a VMSC/VLR (visiting mobile switching center/visiting location register), comprising the steps of:
   receiving an initial address message (IAM) for the mobile device from a gateway mobile switching center (GMSC);
   paging the mobile device that is referenced by the IAM;
   receiving a cancel location message from the home location register (HLR) assigned to the mobile device, the cancel location message including a mobile termination roaming forwarding (MTRF) flag and addresses of a new VMSC/VLR;
   sending a provide roaming number (PRN) message with a MTRF flag to the new VMSC/VLR;
   receiving a PRN Response message from the new VMSC/VLR; and
   forwarding the IAM to the new VMSC/VLR.

2. The method of claim 1 further comprising steps prior to the first receiving step of:
   receiving a provide routing number (PRN) message from the HLR; and
   sending a provide routing number acknowledge message (PRN ACK) to the HLR.

3. The method of claim 1 wherein the mobile device initiates a location update procedure after the IAM message is received.

4. The method of claim 1 further comprising the steps of:
   if the MTRF flag is not set in the cancel location message, requesting the GMSC to reroute the call to the new VMSC/VLR; and
   if the MTRF flag is set in the cancel location message, checking roaming agreements with the new VMSC/VLR in response to the cancel location message and if MTRF is not allowed, requesting the GMSC to reroute the call to the new VMSC/VLR.

5. The method of claim 1 wherein the HLR, old VMSC/VLR and new VMSC/VLR are located in the same Public Land Mobile Network (PLMN).

6. The method of claim 1 wherein the HLR, old VMSC/VLR and new VMSC/VLR are not located in the same Public Land Mobile Network (PLMN) and each checks roaming agreements before performing allowing a MTRF operation.

7. The method of claim 1 wherein the mobile device is an LTE (Long Term Evolution) device, the GMSC is a 2G/3G device, the new VMSC/VLR is an MSC/VLR designated to handle circuit-switched calls for LTE mobile devices and the paging step further comprises the step of sending a circuit-switched page to an LTE radio in the mobile device.

8. A VMSC/VLR (visiting mobile switching center/visiting location register) for use in a telecommunications network for delivering a mobile terminated call to a mobile device, said VMSC/VLR configured to perform the following steps:
   receiving an initial address message (IAM) for the mobile device from a gateway mobile switching center (GMSC);
   paging the mobile device that is referenced by the IAM;
   receiving a cancel location message from the home location register (HLR) assigned to the mobile device, the cancel location message including a mobile termination roaming forwarding (MTRF) flag and addresses of a new VMSC/VLR;
   sending a provide roaming number (PRN) message with a MTRF flag to the new VMSC/VLR;
   receiving a PRN Response message from the new VMSC/VLR; and
   forwarding the IAM to the new VMSC/VLR.

9. An apparatus of claim 8, said apparatus further configured to perform the following step of:
   sending a provide routing number acknowledge message (PRN ACK) to the HLR in response to a PRN message from the HLR in response to the SRI message from the GMSC and wherein the IAM message is received after the PRN ACK message is sent.

10. An apparatus of claim 8, said apparatus further configured to perform the following steps:
- if the MTRF flag is not set in the cancel location message, requesting the GMSC to reroute the call to the new VMSC/VLR; and
- if the MTRF flag is set in the cancel location message, checking roaming agreements with the new VMSC/VLR in response to the cancel location message and if MTRF is not allowed, requesting the GMSC to reroute the call to the new VMSC/VLR.

11. An apparatus of claim 8, said apparatus wherein the HLR, old VMSC/VLR and new VMSC/VLR are not located in the same Public Land Mobile Network (PLMN) and each checks roaming agreements before performing allowing a MTRF operation.

12. An apparatus of claim 8, said apparatus wherein the mobile device is an LTE (Long Term Evolution) device, the GMSC is a 2G/3G device, the new VMSC/VLR is an MSC/VLR designated to handle circuit-switched calls for LTE mobile devices and the paging step further comprises the step of sending a circuit-switched page to an LTE radio in the mobile device.

\* \* \* \* \*